United States Patent [19]
Thomas

[11] 3,781,617
[45] Dec. 25, 1973

[54] REVERSING DRIVE WITH BRAKING FOR OPTICAL COMPONENTS

[75] Inventor: Otto Thomas, Bad Kreuznach, Germany

[73] Assignee: Jos. Schneider & Co. Optische Werke, Kreuznach, Rhineland, Germany

[22] Filed: May 24, 1972

[21] Appl. No.: 256,279

[30] Foreign Application Priority Data
May 26, 1971 Germany.................. P 21 26 132.5

[52] U.S. Cl................................. 318/261, 318/380
[51] Int. Cl. ............................................. H02p 3/12
[58] Field of Search ............318/256–258, 261, 269, 318/375, 379, 380

[56] References Cited
UNITED STATES PATENTS

| | | | |
|---|---|---|---|
| 3,371,259 | 2/1968 | James | 318/380 |
| 2,912,632 | 11/1959 | Turtil | 318/261 |
| 3,371,259 | 2/1968 | James | 318/269 |
| 3,566,227 | 2/1971 | Edhlund | 318/258 |
| 3,611,092 | 10/1971 | Wilmunder | 318/258 |
| 3,440,511 | 4/1969 | Igarashi | 318/269 |

Primary Examiner—Bernard A. Gilheany
Assistant Examiner—Thomas Langer
Attorney—Karl F. Ross

[57] ABSTRACT

To displace a reciprocable component of an optical objective, a reversible d-c motor is energized with current of one or the other polarity. The rotor winding of this motor is shunted by oppositely poled diodes or transistors which are ineffectual in the presence of an external voltage but short-circuit the winding when the motor operates as a generator upon disconnection from the supply, thereby arresting the motor.

6 Claims, 3 Drawing Figures

PATENTED DEC 25 1973                        3,781,617

REVERSING DRIVE WITH BRAKING FOR OPTICAL COMPONENTS

My present invention relates to a driving system for the controlled displacement of a load, particularly of a critical component of an optical objective or the like which must be accurately positioned.

It is known to use a reversible direct-current motor for the control of zoom attachments, iris diaphragms, focusing lenses and similar components reciprocable between two limiting positions, e.g. in large optical equipment such as motionpicture or television cameras.

In commonly owned U.S. Pat. No. 3,656,422 (Hess et al.), for example, a driving unit attachable to a camera has been disclosed in which an electric motor is reversibly energizable via a cable from a remote location to displace a controlled component in one sense or the other.

In order to arrest such a motor and its load in a selected position, it is frequently necessary to provide a special brake since mere open-circuiting of the rotor and/or field winding will allow continued rotation by inertia. Such rotation can be stopped effectively by a short-circuiting of the rotor winding, yet this must be done close to the winding terminals since otherwise the resistance of the current path would be too high. Placing such a short circuit across the rotor winding, at a manually inaccessible location, requires the provision of a relay with an operating circuit of its own.

The object of my present invention is to provide a driving system for the purpose set forth which avoids the need for remote-operated relay switches or a special brake and which effectively immobilizes the load in its selected position even in the case of long supply lines.

This object is realized, in accordance with the present invention, by the provision of at least one solid-state rectifier device (two such devices in the case of a reversible motor) connected across the supply terminals of the rotor winding, the polarity of this device being so chosen as to block the flow of current therethrough from an external source but to pass current generated by the motor itself when the latter, disconnected from its current source, acts as a generator.

The rectifier devices referred to may be constituted by diodes or by controllable triodes (transistors). For reversible driving, by means of an external current source connectable across the supply terminals with either polarity, the two devices will have to be oppositely poled so that each is effective to brake the motor in a respective direction of rotation. Since, however, either device would be a shunt for the supply current upon energization of the motor in the opposite sense, circuit means must be provided in such a case for blocking the flow of forward current through both devices from the external source. If the devices are diodes, the circuit means referred to can be switch contacts which could be operated by the load itself in the two limiting positions thereof, e.g. as described in commonly owned U.S. Pat. No. 3,165,044 (Himmelsbach). If the rectifier devices are transistors, the blocking of the forward flow may be effected by voltage dividers bridged across the supply terminals, an intermediate point or tap on each voltage divider being tied to the input electrode (base) of the associated transistor whose output electrode (collector) is connected to one of the supply terminals while its common electrode (emitter) is returned to the other supply terminal through a biasing resistance.

The above and other features of my invention will be described in detail hereinafter with reference to the accompanying drawing in which.

Figure 1:
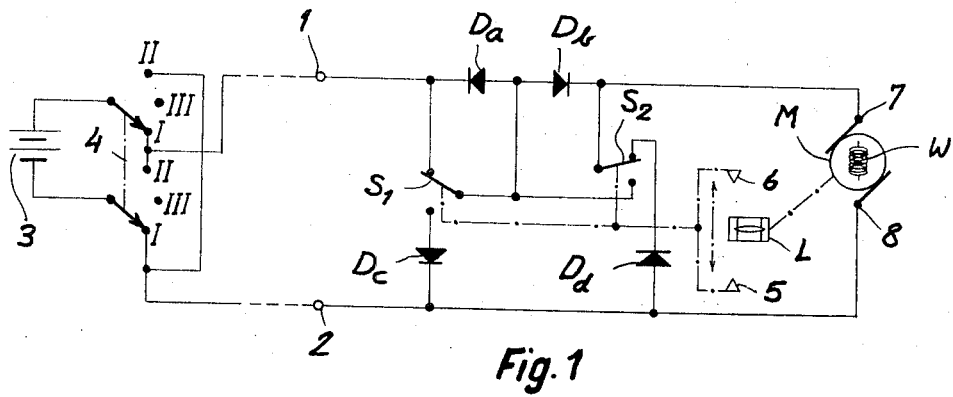
FIG. 1 is a circuit diagram of a first embodiment of a driving system according to the invention.

In FIG. 1 we have shown a reversible d-c motor M whose rotor winding W is energizable, in a circuit including a pair of supply terminals 1, 2, from a battery 3 via a reversing switch 4. Motor M drives a load L, here shown as a camming sleeve for a zoom lens, which in its limiting positions engages either of two abutments 5, 6 for the reversal of two ganged switch contacts or armatures $S_1$, $S_2$. Two diodes $D_a$, $D_b$, lying back to back in series with terminal 1, are alternately short-circuited and connected in series with respective shunt diodes $D_c$ and $D_d$. In the illustrated position I of switch 4, armature $S_1$ shorts the diode $D_a$ whereas armature $S_2$ interconnects the diodes $D_b$ and $D_d$ in bucking relationship; in the alternate switch position II, diode $D_b$ is shorted by aramture $S_2$ whereas armature $S_1$ connects diode $D_c$ in bucking relationship with diode $D_a$. Switch 4 also has an intermediate position III in which supply terminals 1,2 are disconnected from battery 3. Motor M has two input terminals or binding posts 7,8.

Let us consider the operation of the system in the illustrated switch position I. Current flows from the positive pole of battery 3 through terminal 1, armature $S_1$, diode $D_b$ to post 7 of motor M and from its other post 8 via terminal 2 back to the negative pole of the battery. Motor M now drives the load L in one direction, toward the stop 5. If switch 4 is opened (position III) during this traverse, motor M momentarily acts as a generator and sends a current through a short-circuit path established by diode $D_d$ and armature $S_2$. Tbus, motor M stops immediately and arrests the load L in its selected position, e.g. as read on an indicator at a control panel also carrying the switch 4. Thereafter, switch 4 may be returned to position I to continue the traverse of load L to the limit of its stroke when it engages the stop 5 and reverses the armatures $S_1$ and $S_2$. This reversal blocks the flow of operating current from source 3 since diode $D_a$ is now effectively inserted in the energizing circuit. The load can, however, be reverse-actuated at this stage by throwing the switch 4 into its position II whereupon motor M is driven in the opposite sense, current now flowing from positive battery through terminal 2, post 8, winding W, post 7, armature $S_2$, diode $D_a$, terminal 1 back to negative battery. If, during the second traverse, switch 4 is again opened, the motor-generated current finds a short-circuit path from post 7 via armatures $S_2$ and $S_1$ as well as diode $D_c$ back to post 8. After the load has been driven to its other extreme position, its engagement with stop 6 restores the original condition of armatures $S_1$ and $S_2$ to stop the motor until switch 4 is again placed in position I.

Figure 2:
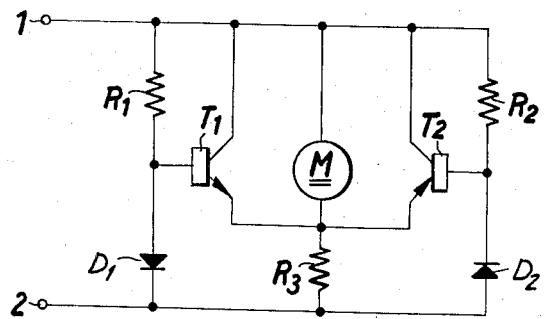
FIG. 2 is a similar circuit diagram (with omission of extraneous elements) for a second embodiment.

FIG. 2 shows an alternate energizing circuit for motor M in which the shorting diodes $D_c$ and $D_d$ of FIG. 1 have been replaced by complementary transistors $T_1$ (NPN) and $T_2$ (PNP), switch contacts $S_1$ and $S_2$ having been omitted. The collectors of transistors $T_1$ and $T_2$ are tied to supply terminal 1 while their interconnected emitters are joined through a biasing resistor $R_3$ to supply terminal 2. A first voltage divider, consisting of a resistor $R_1$ in series with a diode $D_1$, supplies biasing potential to the base of transistor $T_1$ which is connected to the junction of these impedances; the divider is directly bridged across terminals 1 and 2, the polarity of diode $D_1$ being such that only its small forward resistance lies between terminal 2 and the base of transistor $T_1$ when terminals 1 and 2 are respectively connected to positive and negative battery, i.e. when the energizing current for motor M is of a polarity capable of driving the transistor $T_1$. In an analogous manner, a second voltage divider consisting of a resistor $R_2$ and a diode $D_2$ lies between terminals 1 and 2, their junction being connected to the base of transistor $T_2$; again, the small forward resistance of diode $D_2$ biases the transistor base relatively to terminal 2 when the latter is driven positive (with reference to terminal 1) in the presence of an energizing current capable of turning on the transistor $T_2$. Resistors $R_1$ and $R_2$ are, however, of such magnitude that the voltage drop produced by the motor current across resistor $R_3$ equals or exceeds the drop of the voltage across the forward resistance of diode $D_1$ or $D_2$ so that neither transistor conducts as long as the motor is energized from terminals 1 and 2. When this energization stops, the motor-generated current traverses the resistor $R_3$ in series with diode $D_1$ or $D_2$ (as well as resistor $R_1$ or $R_2$) so that the corresponding transistor base is now so biased as to render the transistor conductive, thereby placing a short circuit directly across the motor winding.

Figure 3:
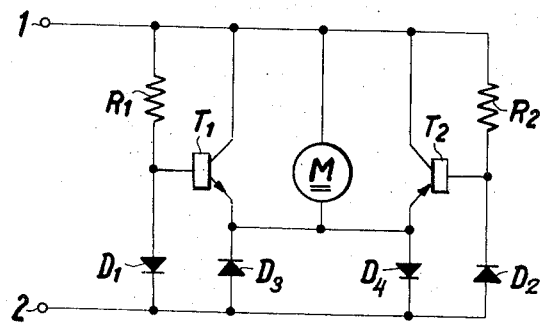
FIG. 3 is a circuit diagram showing a modification of the system of FIG. 2.

As will be apparent from the foregoing, the base potential of either transistor relative to its emitter depends on the magnitude of the motor current which therefore must not be allowed to fall below a certain value if movement is to be maintained. In FIG. 3, however, we show a modified system in which the biasing resistance $R_3$ has been replaced by two antiparellel diodes $D_3$, $D_4$ which maintain a substantilly invariable voltage drop thereacross, equal to that developed across diode $D_1$ or $D_2$, so that transistors $T_1$ and $T_2$ remain cut off as long as motor M does not generate a current of the proper polarity.

I claim:

1. A driving system for the controlled displacement of a load, comprising:
   a direct-current motor provided with a rotor coupled to the load, said rotor including a winding;
   a biasing resistance in series with said winding;
   an energizing circuit for said winding including a pair of supply terminals;
   a source of direct current;
   switch means operable to connect said source across said terminals for energizing said winding by way of said biasing resistance;
   a transistor means with an input electrode, an output electrode and a common electrode, said winding being connected across said output and common electrodes, said output electrode being connected to one of said terminals, said common electrode being connected through said biasing resistance to the other of said terminals; and
   a voltage divider means bridged across said terminals and provided with an intermediate point connected to said input electrode for supplying thereto a cutoff voltage in the presence of current flow from said source through said winding and said biasing resistance, said transistor means being driven conductive by current generated by said motor in said winding upon disconnection of the latter from said source by said switch means.

2. A system as defined in claim 1 wherein said part of said voltage divider includes the forward resistance of a diode connected between said input electrode and said other of said terminals.

3. A system as defined in claim 2 wherein said biasing resistance comprises the forward resistance of a diode.

4. A driving system for the controlled displacement of a load, comprising:
   a reversible direct-current motor provided with a rotor coupled to the load, said rotor including a winding;
   a biasing resistance in series with said winding;
   an energizing circuit for said winding including a pair of supply terminals;
   a source of direct current;
   switch means selectively operable to connect said source with either polarity across said terminals for energizing said winding by way of said biasing resistance;
   a pair of complementary transistors each having an input electrode, an output electrode and a common electrode, said winding being connected between the interconnected output electrodes and the interconnected common electrodes of said transistors, said output electrodes being connected to one of said terminals, said common electrodes being connected through said biasing resistance to the other of said terminals; and
   a pair of voltage divider means bridged in parallel across said terminals, each of said voltage dividers being provided with an intermediate point connected to the input electrode of a respective transistor for supply thereto a cutoff voltage in the presence of current flow of a respective polarity from said source through said winding and said biasing resistance, each transistor being driven conductive by current of said respective polarity generated by said motor in said winding upon disconnection of the latter from said source by said switch means.

5. A system as defined in claim 4 wherein said voltage dividers include diodes each inserted between said other of said terminals and the base of the associated transistor in the forward direction for current of a polarity capable of driving said associated transistor.

6. A system as defined in claim 5 wherein said biasing resistance comprises a pair of antiparallel diodes.

* * * * *